(12) United States Patent
Marinescu

(10) Patent No.: US 7,467,158 B2
(45) Date of Patent: Dec. 16, 2008

(54) OBJECT VIRTUALIZATION

(75) Inventor: Adrian Marinescu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/150,555

(22) Filed: Jun. 10, 2005

(65) Prior Publication Data

US 2006/0282461 A1    Dec. 14, 2006

(51) Int. Cl.
*G06F 17/00* (2006.01)
(52) U.S. Cl. ............... 707/103 Y; 707/10; 707/102; 705/54; 711/203
(58) Field of Classification Search ........... 707/10, 707/102, 103 Y; 705/54; 711/203
See application file for complete search history.

(56) References Cited

U.S. PATENT DOCUMENTS

| | | | | |
|---|---|---|---|---|
| 5,546,558 | A * | 8/1996 | Jacobson et al. | 711/114 |
| 6,199,059 | B1 * | 3/2001 | Dahan et al. | 707/3 |
| 6,202,066 | B1 * | 3/2001 | Barkley et al. | 707/9 |
| 6,519,612 | B1 * | 2/2003 | Howard et al. | 707/200 |
| 6,574,736 | B1 * | 6/2003 | Andrews | 726/21 |
| 2002/0178119 | A1 * | 11/2002 | Griffin et al. | 705/54 |
| 2003/0140051 | A1 * | 7/2003 | Fujiwara et al. | 707/100 |
| 2004/0250120 | A1 * | 12/2004 | Ng | 713/201 |
| 2006/0074989 | A1 * | 4/2006 | Laborczfalvi et al. | 707/200 |

\* cited by examiner

*Primary Examiner*—Shahid A Alam
*Assistant Examiner*—Phong Nguyen
(74) *Attorney, Agent, or Firm*—Woodcock Washburn LLP

(57) ABSTRACT

Object virtualization provides a hierarchy of layers of spaces in which an object is accessible. The hierarchy of layers may include a physical layer containing the physical space in which the object is accessible, and virtual layers containing an arbitrary number of virtual spaces in which an object is accessible. Each virtual space is isolated from one another, so that objects accessible in one virtual space may not necessarily be accessible in another. Interfaces to objects that may be accessible in spaces in the hierarchy of layers facilitate accessing objects in the appropriate space. The appropriate space may be determined from the order of the layers in the hierarchy, alone or in combination with other information about the object and/or the component accessing the object. Accessing the objects in the appropriate space advantageously reduces or eliminates the number of namespace collisions in a computer system.

18 Claims, 6 Drawing Sheets

OBJECT VIRTUALIZATION

TECHNICAL FIELD

In general, the present invention relates to object management in computer software and, more particularly, to object virtualization.

BACKGROUND

In computer software, a namespace generally refers to a unique name assigned to objects originating within the namespace. Existing system platforms provide only a single global namespace regardless the number of applications and users accessing the system's resources. As a result, there are an increasing number of object conflicts, often referred to as namespace collisions, especially given the complexity of today's operating system components, applications, and their interactions. The collisions may manifest as unintentional sharing of objects, resulting in potentially adverse implications for system reliability and security, as well as application malfunction.

SUMMARY

The foregoing problems with the prior state of the art are overcome by the principles of the present invention, which is directed toward methods, systems, computer program products, and data structures for object virtualization.

According to one aspect of the invention, object virtualization provides a hierarchy of layers of spaces in which an object is accessible. Each space is isolated from one another, so that objects accessible in one space may not necessarily be accessible in another.

According to another aspect of the invention, the hierarchy of layers includes one physical layer containing the physical space in which an object is accessible. The physical layer typically has one physical space in which objects exist, and in which an object is accessible by default.

According to one other aspect of the invention, the hierarchy of layers further includes virtual layers containing an arbitrary number of virtual spaces in which an object is accessible. The virtual layers each represent a particular execution context. The execution context comprises a number of different attributes that may or may not be orthogonal. Examples of execution context attributes include, but are not limited to, the security identifier of the current thread or process, the application identifier, the session number, the type of access that is requested, and whether the execution is in a machine emulation mode. The virtual layers may include category layers and intersection layers.

According to one other aspect of the invention, a category layer may be associated with a particular category of execution context attributes. Each category layer contains category virtual spaces for each execution context attribute. For example, an application category layer contains category virtual spaces for each application attribute in the category of application attributes, while a user category layer contains category virtual spaces for each user attribute in the category of user attributes.

According to yet another aspect of the invention, an intersection layer may be associated with an intersection of two or more categories of attributes. Each intersection layer contains a unique intersection virtual space that represents the logical intersection of the respective category virtual spaces in the category layers. An example of an intersection layer is a layer for the intersection of the application and user categories in which each intersection represents one user running a particular application. Objects created by the user while running the application are accessible in that user/application intersection virtual space of the user/application intersection layer, as well as in the user's and application's category virtual spaces in the respective user and application category layers.

According to still another aspect of the invention, objects accessible in a space in any of the layers in the hierarchy of layers, whether a physical space, category virtual space or an intersection virtual space, may include virtualization metadata identifying the layers that have one or more spaces in which the object is accessible. The layers that have one or more spaces in which the object is accessible may be identified in an ordered list in the virtualization metadata. The order of the layers in the list generally indicates the order in which attempts to access the object from the spaces in the hierarchy of layers should be performed. The order of the layers in the list is typically determined in accordance with the hierarchy of the layers such that the first layer in the list corresponds to a lower layer in the hierarchy. The lower layers in the hierarchy are typically the intersection layers having greater numbers of intersections. The last layer in the list is typically the highest layer in the hierarchy, also referred to as the default layer because it contains the physical space in which the object may usually be accessed. The intermediate layers are typically the intersection layers having lesser numbers of intersections and/or the category layers. Accordingly, a layer that is not included in the list indicates that spaces in that layer should be bypassed when attempting to access the object. The layers that have one or more spaces in which the object is accessible may be further associated with an access type in the virtualization metadata. Each layer's associated access type indicates whether access to the spaces in that layer is restricted to certain types of access, such as read only access or write access.

According to yet another aspect of the invention, a virtualization interface is provided to facilitate the virtualization of an object. The virtualization of an object includes the generation of the virtualization metadata identifying the layers that have spaces in which the object is accessible, including the generation of the ordered list. In some cases, the ordered list may be derived from a parent container object that has been previously virtualized. In other cases, the ordered list may be created from information provided to the virtualization interface, including the attributes of the execution context in which the object is created, such as a security identity and/or application identity, and/or any other relevant attributes of the object.

According to yet another aspect of the invention, another virtualization interface is provided to facilitate a determination of the appropriate space in which to access an object. The virtualization interface returns an enumeration of the appropriate spaces in which to access an object. The determination of the appropriate space in which to access an object may be based on the layers identified in the object's virtualization metadata, alone or in combination with attributes of the execution context in which access to the object is being requested, such as a security identity and/or application identity of the calling component that is requesting access to the object, and/or any relevant attributes of the object in light of the requested type of access.

In accordance with yet another aspect of the invention, a system component such as a file system, an inter-process communication ("IPC") mechanism and so on, may use the enumeration of the appropriate spaces in which to access an object alone or in conjunction with the virtualization metadata of the object to implement object virtualization. As a result, the granularity of controlling access to the object is at the object level, advantageously offering improved flexibility and extensibility of virtualization support.

In accordance with yet other aspects of the present invention, a computer-accessible medium for object virtualization is provided, including a medium for storing data structures and computer-executable components for a hierarchy of layers having one or more spaces in which an object is accessible. The data structures define the virtualization metadata, including the hierarchy of layers, the ordered list of layers, and the virtualization interfaces to virtualize an object or to determine the appropriate space in which to access an object, in a manner that is generally consistent with the above-described systems and methods. Likewise, the computer-executable components are capable of performing actions generally consistent with the above-described systems and methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The complex interaction between applications as well as between the applications and the system in which they operate, suggests that there is a need for multiple layers of virtualization. Although some existing systems may support virtualization of certain resources, the mechanisms are rigid and inextensible. In the following discussion, a computing system that is suitable for implementing object virtualization using multiple layers of virtualization in accordance with embodiments of the present invention is described in detail. The multiple layers of virtualization permit access to objects to be controlled at the object level, advantageously providing improved flexibility and extensibility of virtualization support.

In general, the objects that may be virtualized in an embodiment of the present invention include any objects that are typically created by the various components of a computing system. Examples of objects include files, synchronization objects, configuration objects, processes, threads, ports and so on. The components that create the objects are typically processes or kernel mode components, which run in a context of a particular user, application, session, and/or any other entity that requires the resources of the computing system. The virtualized objects may exist in one physical space, but may be accessible in more than one virtual space. Virtual spaces are generally defined as spaces in which objects do not necessarily exist, but in which objects may be accessed. Accordingly, the spaces in which virtualized objects may be accessed include the physical space in which the object exists, by default, and any number of virtual spaces.

Figure 1:
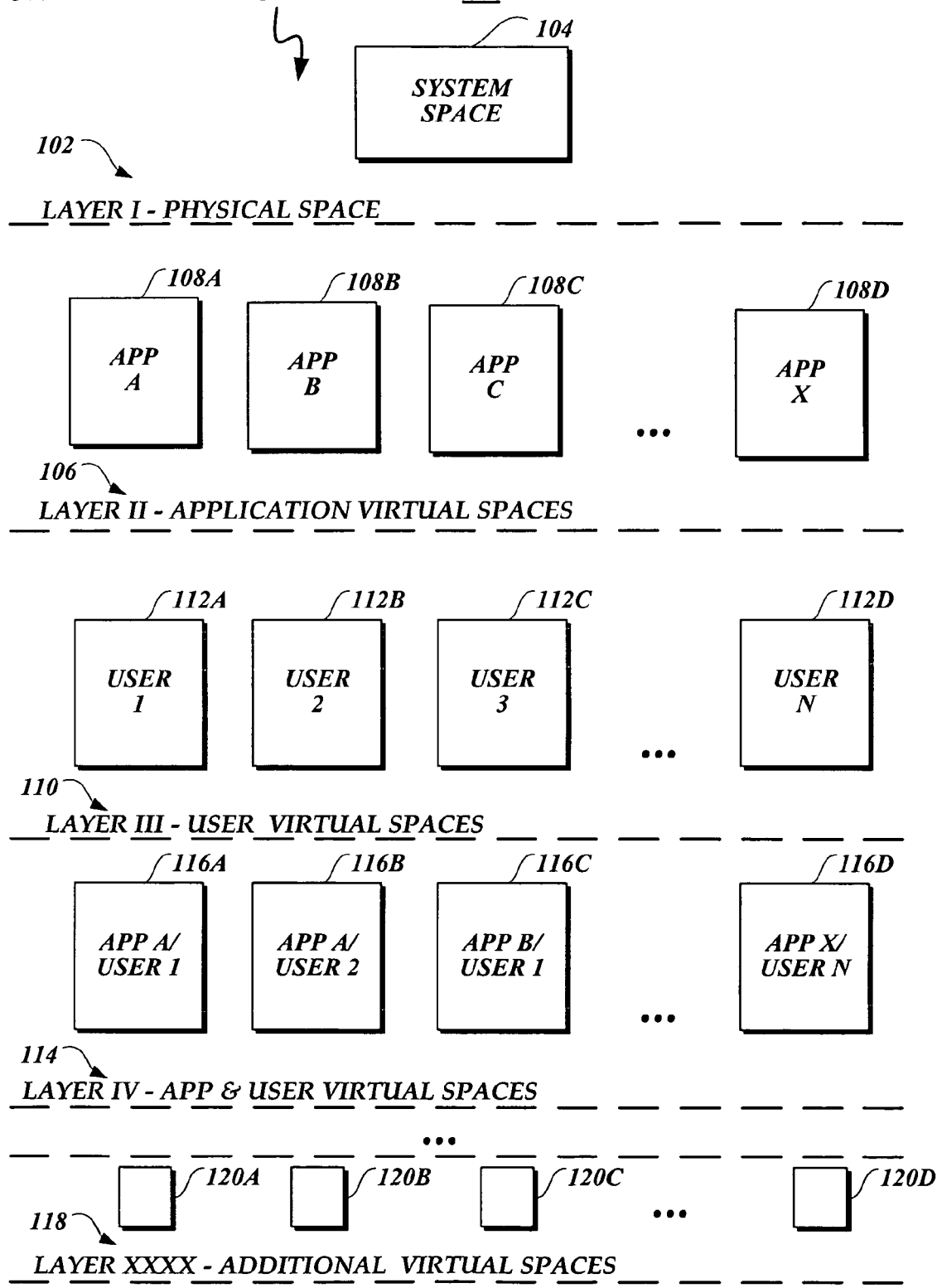
FIG. 1 is a block diagram depicting an overview of an object virtualization system in accordance with the present invention.

FIG. 1 is a block diagram depicting an overview 100 of object virtualization, in which objects may be virtualized in accordance with the present invention. As shown, a hierarchy of layers 100 includes LAYER I 102 containing the system space 104, the physical space in which objects are typically always accessible by default.

The physical space is followed by two category layers, LAYER II 106, and LAYER III 110 containing one or more virtual spaces. LAYER II 106 is an application category layer containing application virtual spaces APP A 108A, APP B 108 B, APP C 108C, and so forth, up to APP X 108D. Likewise, LAYER III 110 is a user category layer containing user virtual spaces USER 1 112A, USER 2 112 B, USER3 112C, and so forth, up until USER N 112D.

In a typical embodiment, the objects that are accessible in virtual spaces in the layers LAYER II 106 and LAYER III 110 are created specifically for virtualization with respect to the appropriate category of execution context attributes. For example, a file that is accessible in a virtual space in an application category layer, LAYER II 106, is created specific to the particular application in each application virtual space. Accordingly, a file that is accessible in APP A 108A virtual space is not accessible in APP B 108B virtual space. Conversely, a file that is accessible in APP B 108B virtual space is not accessible in APP A 108A virtual space. Similarly, a file in a space in the user layer, LAYER III 110, is visible only to the user that created it, and not to other users, regardless of which application (or other attribute of the execution context) is currently executing.

In a typical embodiment, the category layers LAYER II 106 and LAYER III 110 may be followed by at least one intersection layer 114. For example, as illustrated in FIG. 1, LAYER IV 114 is an intersection layer for application and user categories. LAYER IV 114 contains virtual spaces APP A/USER 1 at 116A, APP A/USER 2 at 116B, APP B/USER 1 at 116C, and so forth up to APP X/USER N at 116D. In an intersection layer such as the LAYER IV 114, the objects are accessible only in virtual spaces that correspond to a specific user that is running a particular application. For example, in the illustrated embodiment, intersection layer LAYER IV 114 includes virtual spaces 116A for APP A/USER 1, 116B for APP A/USER 2, 116C for APP B/USER 1, up until 116D for APP X/USER N. Accordingly, a file accessible in virtual space 116A is accessible only for USER 1 running APP A, whereas a file accessible in virtual space 116C is accessible to the same user USER1, but only when he or she is running APP B.

In a typical embodiment, additional layers up to LAYER XXXX 118 containing additional virtual spaces 120A, 120B, 120C and 120D, are provided as appropriate. It is to be understood that the number of layers illustrated in the object virtualization overview/hierarchy of layers 100 in FIG. 1 is by way of example only, and that the number of layers in the hierarchy of layers 100 may be arbitrary and vary greatly from one implementation to another without departing from the scope of the claims that follow. All layers in the hierarchy 100 permit multiple spaces except for the first layer, LAYER I 102, which contains the physical or system space 104.

As will be further described below, objects may be provided with various interfaces to virtualize the object and query the actual layers in the hierarchy of layers 100 that may be used in conjunction with a particular execution context, such as the security identity associated with the query, and the object's properties. Since each space in the hierarchy of layers 100 is unique, in a typical embodiment the spaces may be provided with a unique identifier, such as a key, that distinguishes them from every other space in the hierarchy 100, whether physical or virtual.

Figure 2:
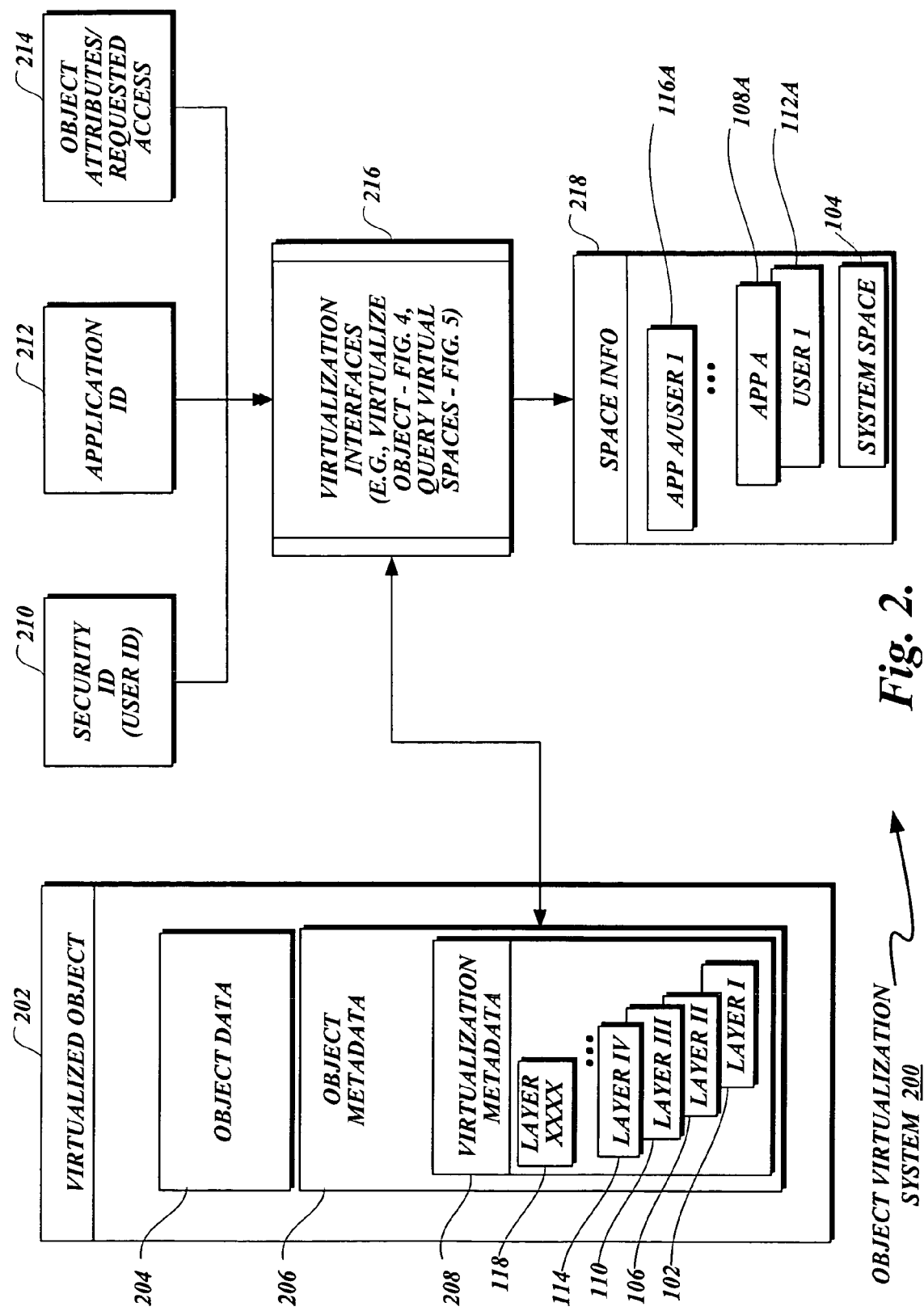
FIG. 2 is a block diagram depicting an object virtualization system and one suitable operating environment in which objects may be virtualized in accordance with the present invention.

FIG. 2 is a block diagram depicting an object virtualization system 200 and one suitable operating environment in which objects may be virtualized in accordance with the present invention. An object that has been virtualized for use in an object virtualization system 200 is referred to as a virtualized object 202. In a typical embodiment, a virtualized object 202 is provided not only with the object data 204 that comprises the object itself, but also with object metadata 206, including virtualization metadata 208. The virtualization metadata 208 is typically expressed as an ordered list of layers. With reference the layers in the example hierarchy of layers 100 illustrated in FIG. 1, the ordered list of layers generally includes the physical layer, here illustrated as LAYER I 102, as well as any virtual layers, here shown as LAYER II 106, LAYER III 110, and LAYER IV 114, etc. up through LAYER XXXX 118 Each layer that has spaces in which the virtualized object 202 is accessible is listed, typically in the order in which attempts to access the object should be performed. The order typically mirrors the order of the layers in the hierarchy of layers 100 illustrated in FIG. 1, beginning with the layer that generally contains the virtual spaces for components with the greatest number of intersections, in this case LAYER XXXX 118. For example, LAYER XXXX 118 might contain virtual spaces for the intersection of three categories of attributes, such as the user, application, and session attributes for a specific user running a particular application during one of the user's sessions on a computing system. Virtualized objects 202 created during that user's session while using that particular application would include, for example, LAYER XXXX 118 in their virtualization metadata 208, so that the computing system would attempt to access the object in the virtual space in LAYER XXXX 118 first, before attempting to reference the object in the layers for the user/application in LAYER IV 114, the user in LAYER III 110, the application in LAYER II 106, the session layer (not shown), or even in the physical space in LAYER I 102.

In a typical embodiment, the virtualized object 202 is provided with virtualization interfaces 216. For example, the virtualization interfaces 216 may include an interface to facilitate the virtualization of an object, as will be described in detail with reference to FIG. 4. As another example, the virtualization interfaces 216 may further include a query virtual spaces interface, as will be described in detail with reference to FIG. 5, to facilitate a determination of the appropriate space in which a component may access a virtualized object 202, from among the spaces contained in the layers of the hierarchy of layers 100 illustrated in FIG. 1.

In a typical embodiment, depending on the requirements of the particular virtualization interface 216, various other data besides the virtualization metadata 208 may be processed by the interface. For example, in the query virtual spaces interface, the other data may include execution context of the query, such as the security ID (e.g., user ID) 210 of a requester of information about a virtualized object 202, the application ID 212 of the component requesting information about the virtualized object 202, and/or the attributes of the object and type of access 214 that is being requested. Other examples of the execution context of the query may include, but are not limited to, the session number, and whether the execution is in a machine emulation mode.

In a typical embodiment, the interface 216 may return information about the object. For example, in the context of the query virtual spaces interface, space information 218 may be returned, where the information identifies the spaces in which the object may be accessed. In the illustrated example, the interface 216 may return one or more virtual spaces such as intersection virtual space APP A/USER I 116A, category virtual space USER I 112A, down to category virtual space APP A 108A, contained in the respective layers LAYER IV 114, LAYER III 110, and LAYER II 106 of the hierarchy of layers 100 illustrated in FIG. 1. In a typical embodiment, the virtual space information 218 may also include the default system space 104 contained in LAYER I 102 of the physical layer illustrated in FIG. 1.

With reference to FIG. 2, it should be noted that an object 202 remains by default a global object, except when the object is virtualized in accordance with an embodiment of the present invention. If the object 202 is persistent, the virtualization metadata 206 is generally also persistent. The virtualization metadata 208 generally describes the rules for accessing that object 202. If no such data is present, as is the most common case, the object 202 will be accessed in the physical location, such as the default system space 104 contained in LAYER I 102 of the physical layer in the hierarchy of layers 100 illustrated in FIG. 1.

Figure 3:
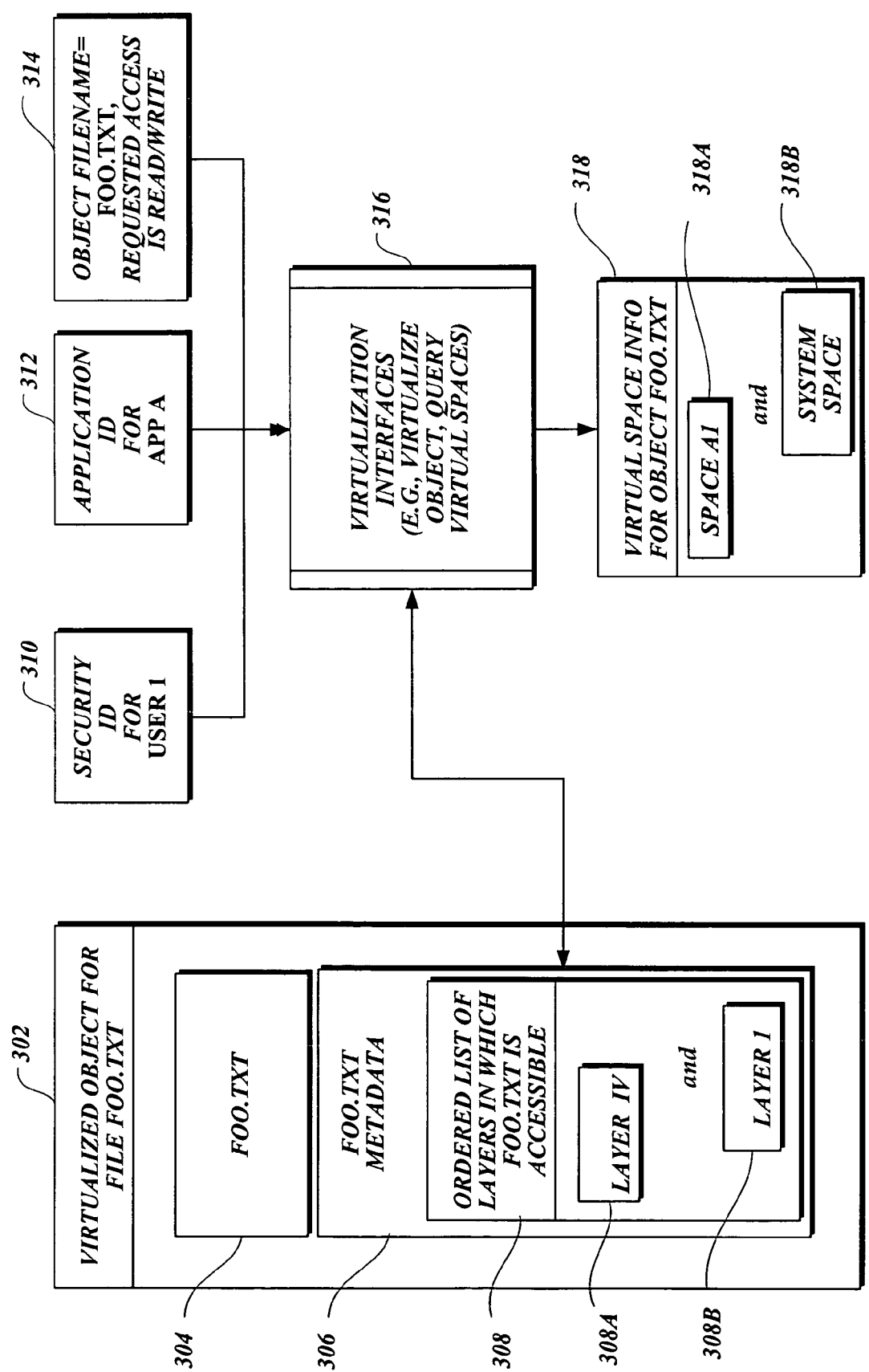
FIG. 3 is a depiction of an exemplary object virtualization system for implementing an embodiment of the present invention.

FIG. 3 is a depiction of an exemplary object virtualization system 300 for implementing an embodiment of the present invention. As shown, the system 300 parallels that of the generalized object virtualization system 200 shown in FIG. 2. In the example, a virtualized object 302 for the file FOO.TXT includes the file itself 304, FOO.TXT, as well as FOO.TXT METADATA 306, including virtualization metadata 308 comprising an ordered list of layers containing spaces in which the file FOO.TXT is accessible. Each layer identified in the list of layers in the virtualization metatdata 308 may further be associated with a type of access to objects permitted in that layer, such as READ ONLY access.

In the illustrated embodiment, the layers include LAYER IV 308A, an intersection layer that contains a virtual space for a user running an application that created the file FOO.TXT, and LAYER I 308B, a physical layer that contains the system space in which the file FOO.TXT is accessible by default.

In a typical embodiment, the virtualization interfaces 316 include a query virtual spaces interface that determines the space or spaces in which to access the virtualized object 302 based on the security ID 310 for USER 1, the user that is running Application A, where Application A is identified by the application ID 312. In one embodiment, the space or spaces in which to access the virtualized object 302 may be further determined based on the attributes of the object 314, such as the filename FOO.TXT, and the requested type of access, in this case READ/WRITE access. In some cases, the space or spaces in which to access the virtualized object may be restricted to a certain type of access, such as READ ONLY access, depending on the type of access, if any, associated with the identified layer for that space in the virtualized metadata. Since the requested type of access in the illustrated embodiment is READ/WRITE access, the space or spaces in which the virtualized object 302 is accessible may be restricted to spaces in layers for which the associated type of access permits both READ and WRITE access, i.e., READ/WRITE access.

In the illustrated embodiment, the virtualization interface 316 may return information about the virtualized object 302, such as the space information 318 for the file FOO.TXT. In this case, the space information 318 identifies two spaces in which the object for the file FOO.TXT may be accessible, i.e., SPACE A1 318A, the virtual space for the intersection of USER 1 and Application A, and the default system space 318B, the physical space in which object 302 may be accessed by default. The returned information 318 is based upon the object's virtualization metadata 308, and the current identity of the requester, the security ID for USER 1 310 and the application ID for Application A 312, and on the object attributes and/or requested access 314.

In some embodiments, the returned information 318 is further based on the requested access 314, in this case READ/WRITE access, or on other attributes of the object 302. For example, if the object's virtualization metadata 308 restricts access to spaces in LAYER IV 308A to READ ONLY, then virtual space A1 318A will not be included in the returned information 318, because the requested access 314 is READ/WRITE access. If access to spaces in LAYER IV 308A is not so restricted, then virtual space SPACE A1 318A will be included in the returned information 318. Assuming that virtual space SPACE A1 318A is included, then the system will first attempt to access the file FOO.TXT in the virtual space SPACE A1 318A in LAYER IV 308A, since LAYER IV 308A was listed first in the ordered list 308. If the attempt at the READ/WRITE file operation fails, then the system will fall through to access the file FOO.TXT in the identified system space 318B in LAYER I 308B (analogous to the system space 104 of LAYER I 102 illustrated in FIG. 1).

It should be noted that the layers and spaces discussed with reference to the virtualization metadata 308 and the returned virtual space information 318 are by way of example only, and that other combinations of layers and spaces may be employed without departing from the scope of the claims that follow. For instance, the virtualization metadata 308 could have included references to the layers containing category virtual spaces for the current user and application attributes, USER 1, and APP A, which could have resulted in different spaces being returned in the virtual space information 318 when querying for the appropriate spaces in which to access the virtualized object 302.

Figure 4:
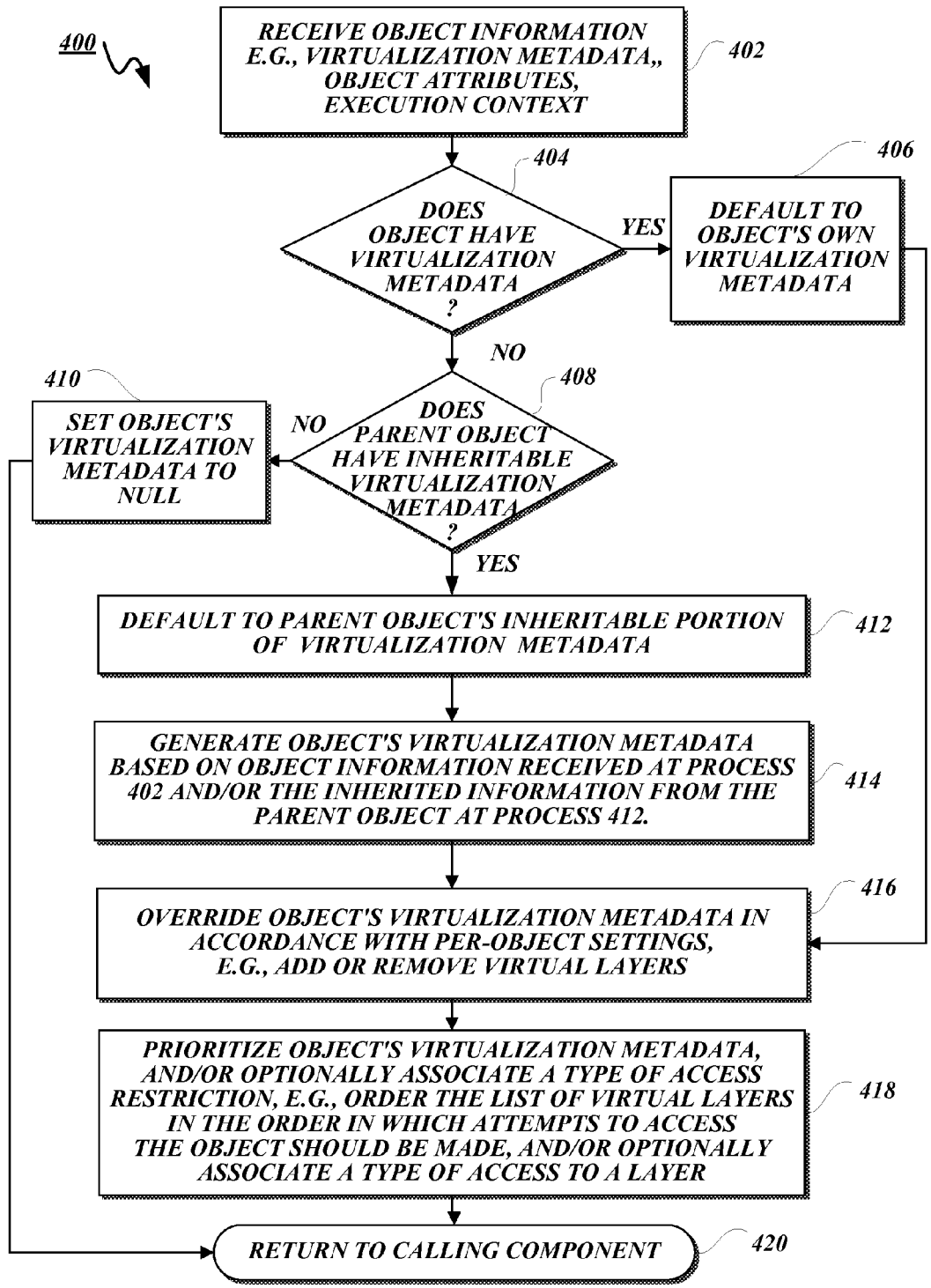
FIG. 4 is a flow diagram illustrating the logic performed for virtualizing an object for use in an object virtualization system as illustrated in FIGS. 1 and 2, in accordance with an embodiment of the present invention.

FIG. 4 is a flow diagram illustrating certain aspects of a method 400 for virtualizing an object in accordance with an embodiment of the present invention. Beginning at process block 402, the method 400 begins with a process to receive information associated with the object's creation. For example, the method 400 may receive object attributes, such as name, parent container, security descriptor, as well as the execution context such as the current user ID and application ID of the component requesting that the object be virtualized. The virtualization metadata may also be provided at this time, but as will be explained below, it is not necessary. In case virtualization metadata is not provided, default virtualization rules will be applied.

Continuing with decision block 404, the method 400 determines whether the interface has been provided with virtualization metadata. If so, then the method 400 continues at process block 406 to default to the object's own virtualization metadata. If not, the method 400 continues at decision block 408 to determine whether the parent container of the object has virtualization metadata.

In a typical embodiment, the virtualization metadata comprises an effective portion and an inheritable portion. The effective portion generally applies to the object that is being virtualized, while the inheritable portion is generally used to propagate a default behavior from a parent container to objects created within the parent container. In some cases, a parent object might not itself be virtualized, but may define rules of virtualization for any new child object created within the parent container. In such cases, the parent object's virtualization metadata will generally contain only the inheritable portion of the virtualization metadata, i.e. the rules of virtualization for the child object.

At decision block 408, the method 400 will typically locate the parent container of the object and proceed to determine whether the parent container's virtualization metadata, if any, is inheritable. If not, the method 400 continues at process block 410 to set the virtualization metadata to a NULL value, and to termination oval 420 to return control to the calling component. If the virtualization metadata is inheritable, however, the method 400 instead continues at process block 412 in which the object receives the inheritable portion of the virtualization metadata from the parent. The method 400 continues at process block 414 to generate virtualization metadata based on the object information received at process block 402 and/or the rules of virtualization inherited from the parent object at process block 412. For example, the method 400 continues at process block 414 to create a list of layers based on the object's attributes, the execution context, and/or the rules of virtualization inherited from the parent object.

However the virtualized metadata is created, the method 400 continues at process block 416 to optionally override the virtualized metadata values in accordance with any per-object settings of the object being virtualized. For example, in one embodiment, the per-object settings may indicate that one or more of the layers in the list of layers should be removed to prevent the object from being accessible in spaces in those layers. Alternatively, or in addition, the method 400 may remove and add layers as appropriate and necessary to minimize or eliminate the namespace collisions that object virtualization is intended to avoid. The only layer than is generally not capable of being overridden in this manner is the default or physical layer, such as LAYER I 102 in FIG. 1.

Continuing at process block 418, the method 400 proceeds to prioritize the virtualization metadata to control the order in which attempts to access the object in the spaces contained in the layers present in the list should be made. In one embodiment, prioritizing the virtualization metadata is achieved by ordering the list of layers in the order in which attempts to access the object should be made. In general, the order of the list of layers corresponds to the order in which the layers are present in the hierarchy of layers 100 illustrated in FIG. 1.

In one embodiment, the method 400 continues in process block 418 to further restrict access to objects by associating an access type with each layer in the list of layers, where the associated access type indicates any restrictions on the type of access to objects in spaces in that layer. For example, if the associated access type for a particular layer is READ ONLY, and the requested type of access in the execution context is READ/WRITE, then access to objects in spaces in the READ ONLY layer is generally not permitted. The method 400 concludes the interface processing at termination oval 420, and returns control to the calling component in the system.

Figure 5:
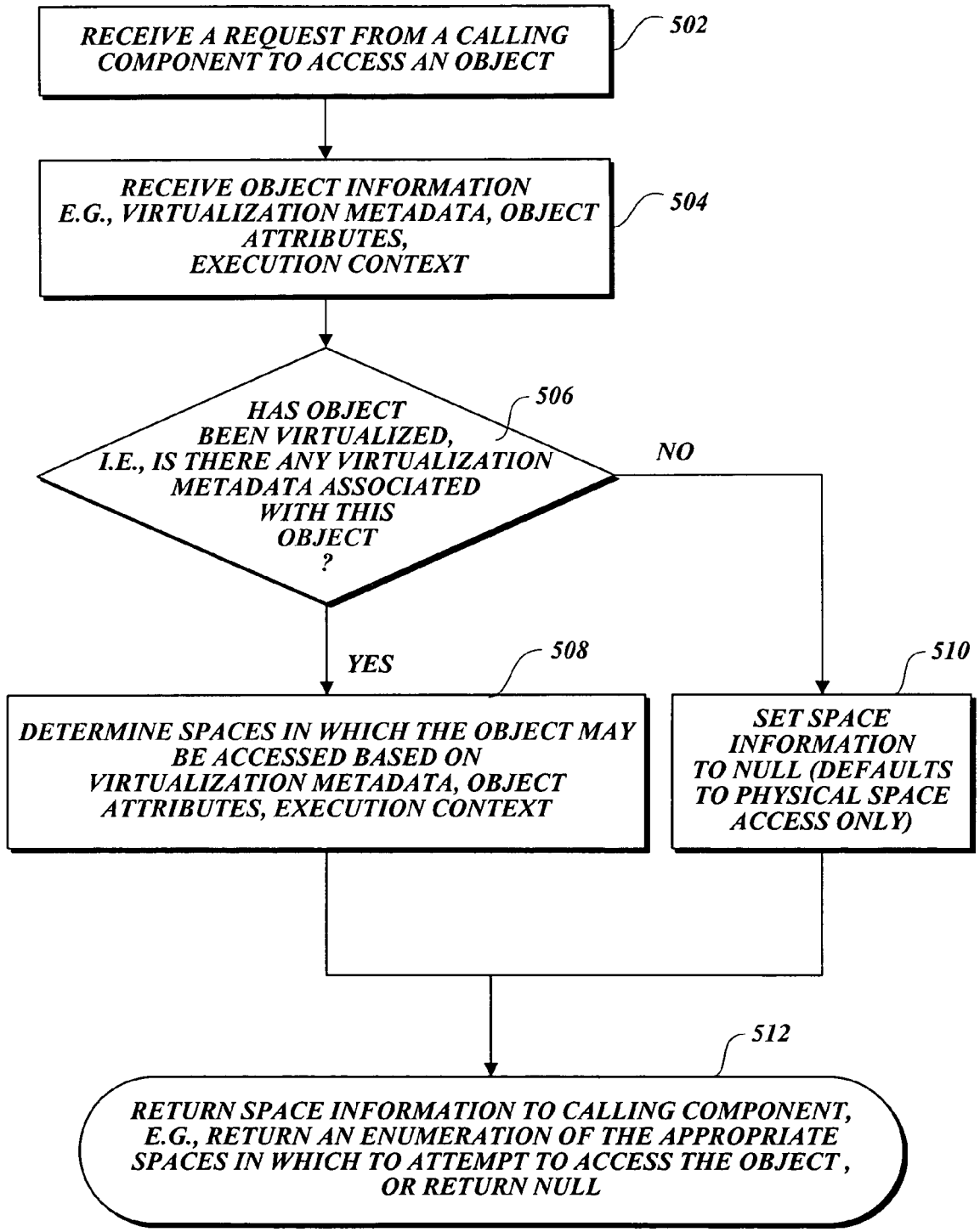
FIG. 5 is a flow diagram illustrating the logic performed for querying an object to obtain virtualization information about the object, in accordance with an embodiment of the present invention.

FIG. 5 is a flow diagram illustrating certain aspects of a method 500 for an interface to query an object by a component to determine the appropriate space or spaces in which to access the object in accordance with an embodiment of the present invention. Beginning at process block 502, the method 500 begins with process 502 to receive a request from a calling component to access an object. The method 500 continues at process block 504 to receive from the calling component any information associated with accessing the object. For example, the method 500 may receive information about the calling execution context, such as the user security ID, as well the application ID and/or session ID associated with the thread execution, as well as the object's attributes, and the virtualization metadata associated with the object, if any.

Continuing with decision block 506, the method 500 determines whether the object has been virtualized. In one embodiment, the method 500 determines whether the object has been virtualized based on whether there is any virtualization metadata associated with the object. If so, then the method 500 continues processing at process block 508 to proceed with obtaining the virtual space information, i.e., the spaces in which the object may be accessible. In one embodiment, at process block 506, the method 500 obtains the virtualization metadata, and analyzes the metadata in conjunction with the execution context and/or object attribute information received at process block 504. For example, the method 500 uses the layers identified in the list and the order of the layers in the list, alone or in combination with any user and application ID information to determine the appropriate virtual spaces in which access should be attempted. Alternatively, or in addition, in some embodiments, the method 500 further uses the attributes of the object and type of access that is being requested to determine the appropriate virtual spaces in which access should be attempted. For example, if the type of access that is being requested is READ/WRITE, but the type of access that is associated with a particular layer is READ ONLY, then the method 500 may determine that spaces in that particular layer are not appropriate virtual spaces in which access should be attempted.

In a typical embodiment, if the method 500 determines that the object has not been virtualized, then the method 500 continues at process block 510 to set the virtual space information to NULL. This has the effect of causing the calling component to access the object in the default space, typically the physical space of the system, such as the system space 104 of LAYER I 102, as previously described with reference to FIG. 1.

In a typical embodiment, the method 500 concludes processing at termination oval 512, returning the virtual space information to the calling component. For example, the method 500 may return an enumeration of the appropriate spaces in which to attempt to access the object. In the case where the method 500 determines that there are no appropriate spaces in which to attempt to access the object, such as when the object has not been virtualized, or when the virtualization metadata for the object, the context information associated with calling component, or the attributes of the object and/or the type of access being requested results in a determination that none of the spaces are appropriate, then the method 500 may return a null value.

Figure 6:
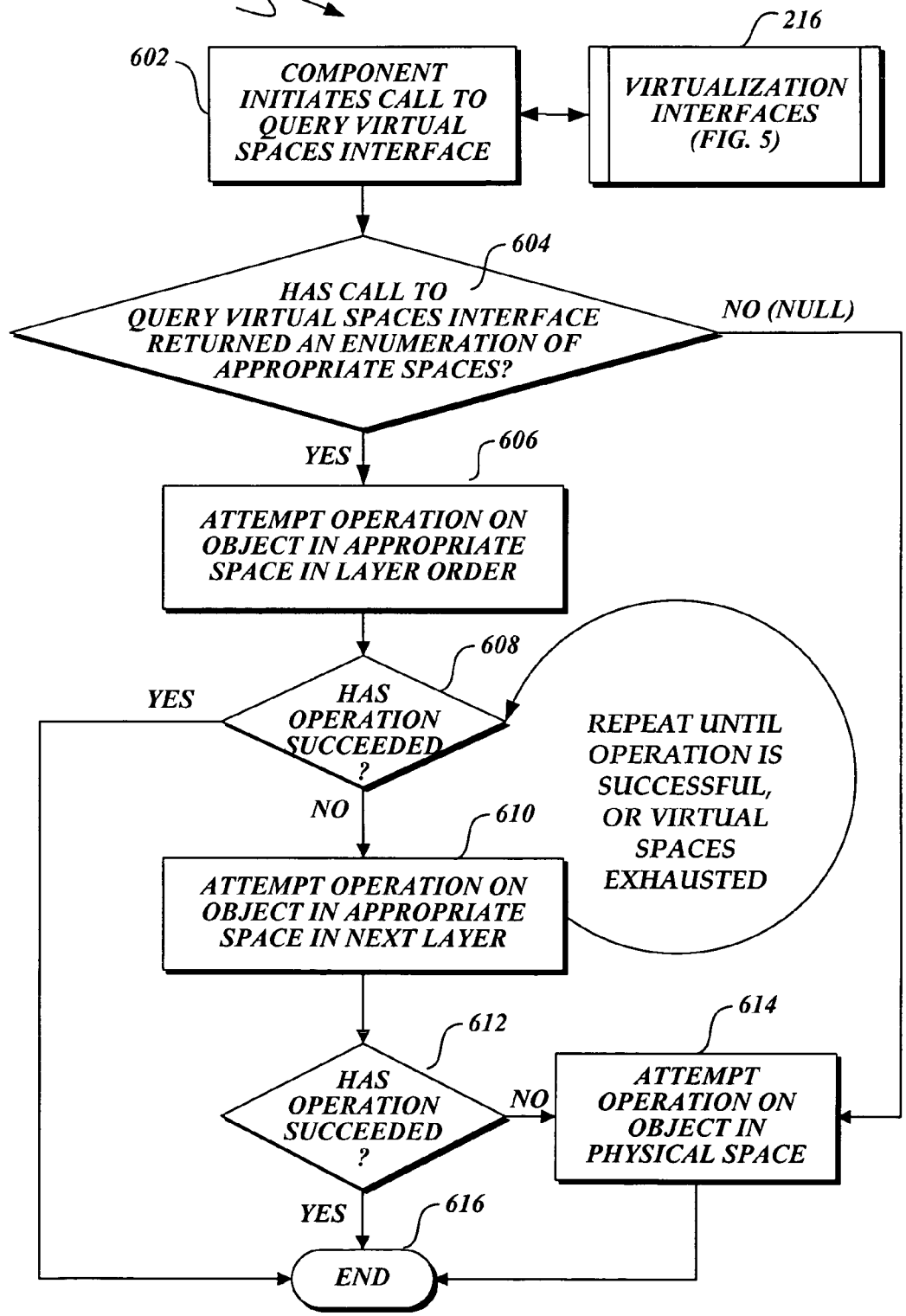
FIG. 6 is a flow diagram illustrating the logic performed for accessing a virtualized object in an object virtualization system, in accordance with an embodiment of the present invention.

FIG. 6 is a flow diagram illustrating certain aspects of a method 600 for a calling component to access an object in accordance with an embodiment of the present invention. Beginning at process block 602, the method 600 begins with a process to initiate a call to a virtualization interface 216 (FIG. 2) to query the object to determine the appropriate spaces in which the access the object, such as the interface described with reference to FIG. 5.

Continuing with decision block 604, the method 600 determines whether the call to the virtualization interface 216 to query the object has returned an enumeration of appropriate space information, or has instead returned null information. If the call to the virtualization interface 216 has returned null information, the method 600 branches to the process block 614 to attempt the desired operation on the object in physical space, such as the system space 104 of LAYER I 102 in the hierarchy of layers 100 described with reference to FIG. 1.

In a typical embodiment, if the call to the virtualization interface 216 to query the object has returned an enumeration of appropriate spaces in which the calling component can attempt access, then the method 600 continues at process block 606 to attempt the desired access in one of those enumerated spaces in the order of the layers associated with the spaces. The method continues at decision block 608 to determine whether the operation on the object has succeeded. If the operation has succeeded, then the method 600 branches to the termination oval 616 to conclude processing. Otherwise, if the operation did not succeed, meaning that the attempt to access the object in the enumerated space has likely failed, then the method 600 continues at process block 610 to attempt the operation on the object in another one of the enumerated spaces associated with the next layer, in accordance with the order of the layers. The method 600 repeats the process at process block 610 until the operation on the object is successful, or until the appropriate spaces that were enumerated in the interface have been exhausted.

In a typical embodiment, the method 600 continues at decision block 612 to determine again whether the operation has succeeded in the subsequent attempts to access the object in the enumerated appropriate spaces. If not, then the method 600 branches to process block 614 to attempt the operation on the object one last time in the default physical space. Otherwise, the method concludes the processing at termination oval 616.

In the foregoing discussion, a computing system suitable for implementing various features of object virtualization in accordance with embodiments of the invention includes, for example, a personal computer usable in a distributed computing environment, in which complementary tasks may be performed by remote computing devices linked together through a communication network. However, those skilled in the art will appreciate that embodiments of the invention may be practiced with many other computer system configurations. For example, embodiments of the invention may be practiced with a personal computer operating in a standalone environment, or with multiprocessor systems, minicomputers, mainframe computers, and the like. In addition, those skilled in the art will recognize that embodiments of the invention may be practiced on other kinds of computing devices including laptop computers, tablet computers, personal digital assistants (PDAs), cell phones, game consoles, personal media devices, or any device upon which computer software or other digital content is installed.

For the sake of convenience, some of the description of the computing system suitable for implementing various features of the invention may have included references to the Windows operating system, and/or references to various other Microsoft products. However, those skilled in the art will recognize that those references are only illustrative and do not serve to limit the general application of embodiments of the invention. For example, embodiments of the invention may be practiced in the context of other operating systems such as the LINUX or UNIX operating systems, and other general-purpose software.

Certain aspects of embodiments of the invention have been described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

What is claimed is:

1. A computing system comprising a data processor and memory, the memory storing computer executable code that, when executed by the data processor of the computing system, creates virtual objects suitable for accessing data stored in the memory of the computing system, the computer executable code defining:

spaces in which objects accessible in one space may not be accessible in other spaces, each space being isolated from one another, the spaces including physical space in which the objects exist and virtual spaces in which the objects do not exist, wherein the virtual spaces are spaces in which the object is accessible in accordance with at least one of the object's metadata, an execution context of a component seeking access, and a type of access the component is seeking, and wherein the physical space is the space in which objects are accessible when no object's metadata is present;

a hierarchy of layers of spaces, the hierarchy including a physical layer and a plurality of virtual layers, the physical layer containing the physical space in which objects are accessible, the virtual layers containing a plurality of virtual spaces;

an object having metadata identifying which of the virtual layers in the hierarchy of layers have spaces in which the object is accessible, the metadata comprising an ordered list of layers in which the object is accessible, the ordered list corresponding to the hierarchy of layers, the ordered list reflecting an order in which attempts to access the object are performed, the ordered list beginning with the layer containing the greatest number of intersections of categories of attributes;

a first interface to the object for facilitating a virtualization of the object, wherein the virtualization includes the generation of the metadata identifying the layers that have spaces in which the object is accessible and the generation of an ordered list of layers in which the object is accessible; and a second interface to the object for determining in which of the spaces in the identified layers the object should be accessed and an order of the spaces in the identified layers in which the object should be accessed, wherein the order of the spaces in the identified layers in which the object should be accessed is determined in accordance with the hierarchy of layers of the spaces, and wherein determining in which of the spaces in the identified layers the object should be accessed occurs in response to a request from a calling software component to access the object.

2. The system of claim 1, wherein the virtual layer includes a plurality of organized virtual spaces such that an object accessible in one of the virtual spaces is not accessible in other virtual spaces.

3. The system of claim 2, wherein the virtual layer is associated with a category of attributes, wherein the virtual spaces include a virtual space for each attribute in the category, the virtual space being a space in which objects specific to the attribute may be accessed.

4. The system of claim 3, wherein the virtual layer is associated with an intersection of at least two categories of attributes, wherein the virtual spaces include an intersection virtual space for each intersecting attribute in the at least two categories of attributes, the intersection virtual space being a space in which objects specific to each intersecting attribute may be accessed.

5. The system of claim 4, wherein the category of attributes includes at least one of an application, a user, and a session category, wherein the object in the virtual space specific to the user attribute is accessible only by the user corresponding to the user attribute, and the object in the virtual space specific to the application attribute is accessible only by the application corresponding to the application attribute.

6. The system of claim 5, wherein the intersection of at least two categories of attributes includes at least one of an intersection between an application category and a user category, and an intersection between an application, user, and session category, wherein the object in the virtual space specific to the intersection between the application category and the user category is accessible only by the user corresponding to the application category and the user category.

7. A computer-implemented method for creating virtual objects suitable for accessing data stored in the memory of a computing system comprising:

defining spaces in which objects accessible in one space may not be accessible in other spaces, each space being isolated from one another, the spaces including physical space in which the objects exist and virtual spaces in which the objects do not exist, wherein the virtual spaces are spaces in which the object is accessible in accordance with at least one of the object's metadata, an execution context of a component seeking access, and a type of access the component is seeking, and wherein the physical space is the space in which objects are accessible when no object's metadata is present;

defining a hierarchy of layers of spaces, the hierarchy including a physical layer and a plurality of virtual layers, the physical layer containing the physical space in which objects are accessible, the virtual layers containing a plurality of virtual spaces;

determining metadata of an object which of the virtual layers in the hierarchy of layers have spaces in which the object is accessible, the metadata comprising an ordered list of layers in which the object is accessible, the ordered list corresponding to the hierarchy of layers, the ordered list reflecting an order in which attempts to access the object are performed, the ordered list beginning with the layer containing the greatest number of intersections of categories of attributes;

facilitating a virtualization of the object, wherein the virtualization includes the generation of the metadata identifying the layers that have spaces in which the object is accessible and the generation of an ordered list of layers in which the object is accessible; and determining in which of the spaces in the identified layers the object should be accessed and an order of the spaces in the identified layers in which the object should be accessed, wherein the order of the spaces in the identified layers in which the object should be accessed is determined in accordance with the hierarchy of layers of the spaces, and wherein determining in which of the spaces in the identified layers the object should be accessed occurs in response to a request from a calling software component to access the object.

8. The method of claim 7, wherein the virtual layer includes a plurality of organized virtual spaces such that an object accessible in one of the virtual spaces is not accessible in other virtual spaces.

9. The method of claim 8, wherein the virtual layer is associated with a category of attributes, wherein the virtual spaces include a virtual space for each attribute in the category, the virtual space being a space in which objects specific to the attribute may be accessed.

10. The method of claim 9, wherein the virtual layer is associated with an intersection of at least two categories of attributes, wherein the virtual spaces include an intersection virtual space for each intersecting attribute in the at least two categories of attributes, the intersection virtual space being a space in which objects specific to each intersecting attribute may be accessed.

11. The method of claim 10, wherein the category of attributes includes at least one of an application, a user, and a session category wherein the object in the virtual space specific to the user attribute is accessible only by the user corresponding to the user attribute, and the object in the virtual space specific to the application attribute is accessible only by the application corresponding to the application attribute.

12. The method of claim 11, wherein the intersection of at least two categories of attributes includes at least one of an intersection between an application category and a user category, and an intersection between an application, user, and session category wherein the object in the virtual space specific to the intersection between the application category and the user category is accessible only by the user corresponding to the application category and the user category.

13. A computer readable storage medium for creating virtual objects suitable for accessing data stored in the memory of a computing system comprising:

defining spaces in which objects accessible in one space may not be accessible in other spaces, each space being isolated from one another, the spaces including physical space in which the objects exist and virtual spaces in which the objects do not exist, wherein the virtual spaces are spaces in which the object is accessible in accordance with at least one of the object's metadata, an execution context of a component seeking access, and a type of access the component is seeking, and wherein the physical space is the space in which objects are accessible when no object's metadata is present;

defining a hierarchy of layers of spaces, the hierarchy including a physical layer and a plurality of virtual layers, the physical layer containing the physical space in which objects are accessible, the virtual layers containing a plurality of virtual spaces;

determining metadata of an object which of the virtual layers in the hierarchy of layers have spaces in which the object is accessible, the metadata comprising an ordered list of layers in which the object is accessible, the ordered list corresponding to the hierarchy of layers, the ordered list reflecting an order in which attempts to access the object are performed, the ordered list beginning with the layer containing the greatest number of intersections of categories of attributes;

facilitating a virtualization of the object, wherein the virtualization includes the generation of the metadata identifying the layers that have spaces in which the object is accessible and the generation of an ordered list of layers in which the object is accessible; and determining in which of the spaces in the identified layers the object should be accessed and an order of the spaces in the identified layers in which the object should be accessed, wherein the order of the spaces in the identified layers in which the object should be accessed is determined in accordance with the hierarchy of layers of the spaces, and wherein determining in which of the spaces in the identified layers the object should be accessed occurs in response to a request from a calling software component to access the object.

14. The computer readable storage medium of claim 13, wherein the virtual layer includes a plurality of organized virtual spaces such that an object accessible in one of the virtual spaces is not accessible in other virtual spaces.

15. The computer readable storage medium of claim 14, wherein the virtual layer is associated with a category of attributes, wherein the virtual spaces include a virtual space for each attribute in the category, the virtual space being a space in which objects specific to the attribute may be accessed.

16. The computer readable storage medium of claim 15, wherein the virtual layer is associated with an intersection of at least two categories of attributes, wherein the virtual spaces include an intersection virtual space for each intersecting attribute in the at least two categories of attributes, the intersection virtual space being a space in which objects specific to each intersecting attribute may be accessed.

17. The computer readable storage medium of claim 16, wherein the category of attributes includes at least one of an application, a user, and a session category wherein the object in the virtual space specific to the user attribute is accessible only by the user corresponding to the user attribute, and the object in the virtual space specific to the application attribute is accessible only by the application corresponding to the application attribute.

18. The computer readable storage medium of claim 17, wherein the intersection of at least two categories of attributes includes at least one of an intersection between an application category and a user category, and an intersection between an application, user, and session category wherein the object in the virtual space specific to the intersection between the application category and the user category is accessible only by the user corresponding to the application category and the user category.

* * * * *